United States Patent
Ficara et al.

(10) Patent No.: US 12,081,534 B2
(45) Date of Patent: Sep. 3, 2024

(54) ONBOARDING CLIENT DEVICE TO USER-DEFINED NETWORK USING FEDERATION-BASED NETWORK IDENTITY

(71) Applicant: Cisco Technology, Inc., San Jose, CA (US)

(72) Inventors: Domenico Ficara, Essertines-sur-Yverdon (CH); Roberto Muccifora, Ropraz (CH); Amine Choukir, Lausanne (CH); Shree N. Murthy, San Jose, CA (US); Bart A. Brinckman, Nevele (BE); Mirko Raca, Morges (CH)

(73) Assignee: Cisco Technology, Inc., San Jose, CA (US)

( * ) Notice: Subject to any disclaimer, the term of this patent is extended or adjusted under 35 U.S.C. 154(b) by 513 days.

(21) Appl. No.: 17/444,021

(22) Filed: Jul. 29, 2021

(65) Prior Publication Data

US 2023/0036506 A1   Feb. 2, 2023

(51) Int. Cl.
*H04L 9/40*       (2022.01)

(52) U.S. Cl.
CPC ...... *H04L 63/0815* (2013.01); *H04L 63/0876* (2013.01); *H04L 63/101* (2013.01); *H04L 63/104* (2013.01)

(58) Field of Classification Search
CPC .......... H04L 63/0815; H04L 63/0876; H04L 63/101; H04L 63/104; H04L 51/58; H04L 63/0892; H04L 67/303; H04L 12/1822; H04L 12/4641; H04W 12/06; H04W 4/02; H04W 48/18; H04W 84/12; H04W 4/08
See application file for complete search history.

(56) References Cited

U.S. PATENT DOCUMENTS

| | | | |
|---|---|---|---|
| 9,686,404 B1* | 6/2017 | Pan | H04W 12/068 |
| 2007/0265005 A1* | 11/2007 | Sitch | H04W 48/18 |
| | | | 455/435.1 |

(Continued)

FOREIGN PATENT DOCUMENTS

WO    2021119654 A1    6/2021

OTHER PUBLICATIONS

International Search Report and Written Opinion for PCT Application No. PCT/US2022/074256, dated Nov. 7, 2022.

(Continued)

*Primary Examiner* — Catherine Thiaw
(74) *Attorney, Agent, or Firm* — Patterson + Sheridan, LLP (57) ABSTRACT

Aspects described herein include a method of automated grouping of client devices for a user-defined network (UDN). The method includes receiving, from a client device an authentication request to join an access provider network. The authentication request includes a unique identifier of the client device for a federation-based network. The method further includes transmitting the unique identifier to a UDN cloud, transmitting the authentication request to an identity provider, and receiving, responsive to the identity provider authenticating the authentication request, a list of one or more UDNs from the UDN cloud that are associated with the unique identifier. The method further includes joining the client device with one or more other client devices present on the access provider network listing a same UDN.

20 Claims, 7 Drawing Sheets

(56) References Cited

U.S. PATENT DOCUMENTS

| | | | |
|---|---|---|---|
| 2012/0281609 A1 | 11/2012 | Kasslin et al. | |
| 2013/0024516 A1* | 1/2013 | Blinder | G06Q 50/01 |
| | | | 709/204 |
| 2014/0269653 A1 | 9/2014 | Gupta et al. | |
| 2015/0334634 A1* | 11/2015 | Jiang | H04W 4/20 |
| | | | 370/329 |
| 2017/0230905 A1 | 8/2017 | Pularikkal et al. | |
| 2019/0098674 A1* | 3/2019 | Pallen | H04W 4/023 |
| 2019/0215692 A1 | 7/2019 | Grayson et al. | |
| 2020/0163013 A1 | 5/2020 | Grayson et al. | |
| 2021/0185533 A1 | 6/2021 | Ficara et al. | |
| 2021/0218727 A1 | 7/2021 | Smith et al. | |
| 2023/0379799 A1* | 11/2023 | Zeng | H04W 12/03 |

OTHER PUBLICATIONS

Musa et al., "Agrregation management design for user-definied network infrastructure", The 16th Asia-Pacific Network Operations and Management Symposium, IEEE, Sep. 17, 2014 (Sep. 17, 2014), pp. 1-4, XP0327113744.

Raj Gajwani, "Orion Wifi Helps Venues Improve Cellular Coverage," Google—The Keyword, Sep. 8, 2020.

U.S. Appl. No. 17/236,659, filed Apr. 21, 2021.

U.S. Appl. No. 17/314,609, filed May 7, 2021.

U.S. Appl. No. 17/215,138, filed Mar. 29, 2021.

AirGroup, "AirGroup Architecture," Aruba Networks, Accessed Oct. 29, 2021, pp. 1 https://www.arubanetworks.com/techdocs/InstantWenger_Mobile/Advanced/Content/AirGroup%20Architecture.htm.

Carol Ansley, Mark Hamilton, Jay Strater, Kurt Lumbatis, "Proposal for New Action Frame to Aid Mac Randomization Handling," IEEE, dated Jul. 18, 2019, pp. 1-9.

Android.Com, "Implementing MAC Randomization," Core Topics, Accessed Oct. 29, 2021, pp. 1-4, https://source.android.com/devices/tech/connect/wifi-mac-randomization.

* cited by examiner

ONBOARDING CLIENT DEVICE TO USER-DEFINED NETWORK USING FEDERATION-BASED NETWORK IDENTITY

TECHNICAL FIELD

Embodiments presented in this disclosure generally relate to wireless networking, and more specifically, to techniques for onboarding client devices to user-defined networks (UDNs) using an identity for a federation-based network.

BACKGROUND

Consumers increasingly expect their computing devices to remain connected to network-based services, regardless of their location. However, cellular services such as 4G LTE and 5G may provide less than optimal connections for certain locations that are indoors, far from cell towers, and/or otherwise obstructed. Technologies such as the Wireless Broadband Alliance's (WBA) OpenRoaming™ use a federation-based framework to allow consumers to seamlessly roam onto Wi-Fi networks.

User-defined networks (UDNs) allow private networks to be established in a shared or public networking infrastructure. Using UDNs, a private network may include a set of users and devices that span multiple virtual local area networks (VLANs) and/or wireless LANs. The private network can be manually configured or automatically configured, e.g., based on location. Thus, service discovery, link-local multicast (LLM), broadcast traffic, and optionally unicast traffic may be contained within the private network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method of automated grouping of client devices for a user-defined network (UDN). The method comprises receiving, from a client device, an authentication request to join an access provider network. The authentication request includes a unique identifier of the client device for a federation-based network. The method further comprises transmitting the unique identifier to a UDN cloud, and transmitting the authentication request to an identity provider. The method further comprises receiving, responsive to the identity provider authenticating the authentication request, a list of one or more UDNs from the UDN cloud that are associated with the unique identifier. The method further comprises joining the client device with one or more other client devices present on the access provider network listing a same UDN.

Another embodiment presented in this disclosure is a network device comprising one or more computer processors configured to perform an operation comprising receiving, from a client device, an authentication request to join an access provider network. The authentication request includes a unique identifier of the client device for a federation-based network. The operation further comprises transmitting the unique identifier to a UDN cloud, and transmitting the authentication request to an identity provider. The operation further comprises receiving, responsive to the identity provider authenticating the authentication request, a list of one or more UDNs from the UDN cloud that are associated with the unique identifier. The operation further comprises joining the client device with one or more other client devices present on the access provider network listing a same UDN.

Another embodiment presented in this disclosure is a computer program product comprising a computer-readable storage medium having computer-readable program code embodied therewith. The computer-readable program code is executable by one or more computer processors to perform an operation comprising receiving, from a client device, an authentication request to join an access provider network. The authentication request includes a unique identifier of the client device for a federation-based network. The operation further comprises transmitting the unique identifier to the a UDN cloud, and transmitting the authentication request to an identity provider. The operation further comprises receiving, responsive to the identity provider authenticating the authentication request, a list of one or more UDNs from the UDN cloud that are associated with the unique identifier. The operation further comprises joining the client device with one or more other client devices present on the access provider network listing a same UDN.

Example Embodiments

Target deployments for user-defined networks (UDNs) include locations where a personalized, private network should be established in a shared or public networking infrastructure. Some example locations include dormitories, universities, multi-dwelling units, hospitals, hotels, entertainment venues, and so forth.

A user may generally access all of the devices joined to the UDN, and may extend access to the UDN by sending invitations to other users. By creating a logical grouping of users and devices through the UDN, only those devices within the UDN may see (and may advertise services to) each other.

UDNs are typically defined by grouping Media Access Control (MAC) addresses of the devices as an identifier. In some cases, a user of the UDN must manually search for the MAC address(es) of the devices, and must use a specialized application, to enter the MAC address(es). However, due to privacy concerns, devices may intermittently change their MAC addresses (e.g., using MAC randomization), which would cause access of the device to the UDN to be disrupted. For example, if a user registers a device with the UDN using a first Service Set Identifier (SSID), and later tries to access the UDN using another SSID, the user will be unable to access the UDN if MAC randomization had been executed on the device before joining the second SS ID.

Technologies such as OpenRoaming™ permit client devices to roam to different network access providers without requiring repeated logins or authentications. In some cases, identity providers may seek to offer additional services beyond roaming, such as providing network-based (e.g., cloud-based) services to the client devices.

In embodiments described herein, a method is disclosed for automated grouping of client devices for a UDN. The authentication request includes a unique identifier of the client device that is known by the federation-based network. The method further comprises transmitting the unique identifier to a UDN cloud and transmitting the authentication request to an identity provider. The method further comprises receiving, responsive to the identity provider authenticating the authentication request, a list of one or more UDNs from the UDN cloud that are associated with the unique identifier. The method further comprises joining, responsive to determining that one or more other devices on the access provider network belong to the same UDN, the client device with the other device(s) belonging to the same UDN Beneficially, using the method may make unnecessary the manual configuration of UDN and may support client devices using MAC randomization. Additionally, UDNs may be managed and moved across different networks by using the federation-based network (e.g., an OpenRoaming™ network) as the source of UDN-grouping information.

Figure 1:
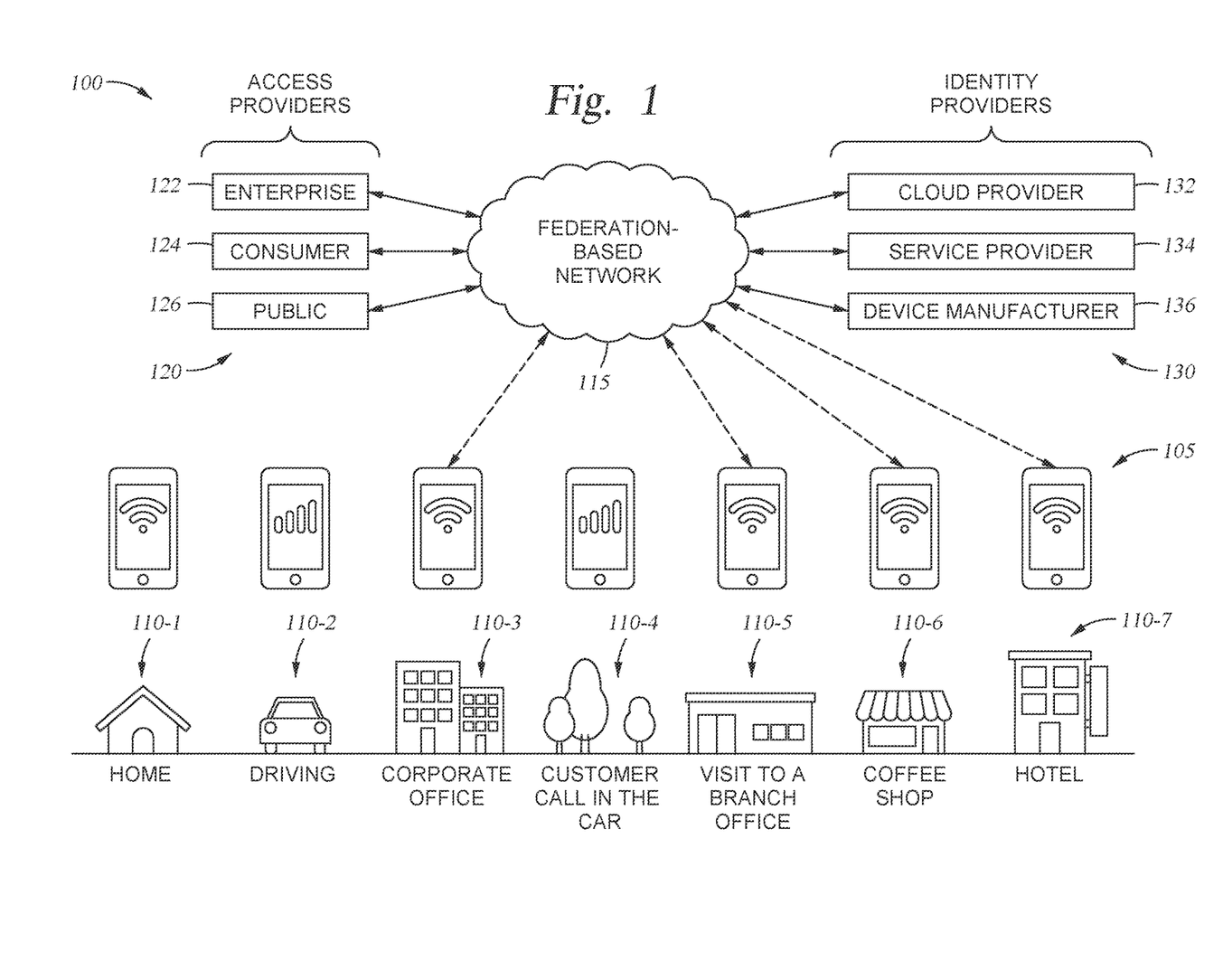
FIG. 1 is a diagram illustrating connection of a client device to a federation-based network while roaming, according to one or more embodiments.

FIG. 1 is a diagram 100 illustrating connections of a client device 105 to a federation-based network 115 while roaming, according to one or more embodiments. The diagram 100 represents an example sequence of usage of a client device 105 by a user. For example, the sequence may represent a work trip of the user.

The client device 105 may be implemented in any form suitable for wireless networking. In some embodiments, the client device 105 is implemented as a mobile computing device, such as a laptop computer, a tablet, a smartphone, or a smart wearable device. In other embodiments, the client device 105 may be a computing device integrated into a vehicle.

At the beginning of the sequence, the user is at home 110-1 and the client device 105 is wirelessly connected to a home network (e.g., a Wi-Fi network) providing accessibility to an external network, such as a local area or local access network (LAN), a general wide area network (WAN), and/or a public network (e.g., the Internet). While the user is driving 110-2 a car, the client device 105 is wirelessly connected to a cellular network, such as a 4G LTE or 5G cellular network. When the user arrives at a corporate office 110-3, the client device 105 roams from the cellular network to a Wi-Fi network operated by the corporate office 110-3. The user returns to the car to conduct a customer call 110-4, and the client device 105 reconnects to the cellular network when out of range of the Wi-Fi network. The client device 105 later roams to different Wi-Fi networks when the user visits a branch office 110-5, a coffee shop 110-6, and a hotel 110-7.

When roaming to the different Wi-Fi networks (e.g., at the corporate office 110-3, the branch office 110-5, the coffee shop 110-6, and the hotel 110-7), the client device 105 uses a federation-based network 115 to access the external network. The federation-based network 115 may be implemented using any standardized and/or proprietary techniques and protocols. For example, the federation-based network 115 may be compliant with OpenRoaming™.

The federation-based network 115 comprises a plurality of access providers 120 (also referred to as "access network providers") providing wireless connectivity for the client device 105 using, e.g., access points, wireless LAN controllers, and so forth. Some non-limiting examples of the access providers 120 include enterprise access providers 122 (e.g., employers, manufacturing facilities), consumer access providers 124 (e.g., hotels, retailers), public access providers 126 (e.g., airports, universities, venues), and so forth.

The federation-based network 115 comprises a plurality of identity providers 130 that operate to create, maintain, and/or manage identity information for users and that provide authentication services within the federation-based network 115. Some non-limiting examples of the identity providers 130 include cloud providers 132 (e.g., vendors providing scalable computing resources), service providers 134 (e.g., telecommunications companies, utilities), and device manufacturers 136. By using the identity providers 130 to authenticate the user, the client device 105 may roam to the different access providers 120 without requiring repeated logins or authentications from the user.

Figure 2:
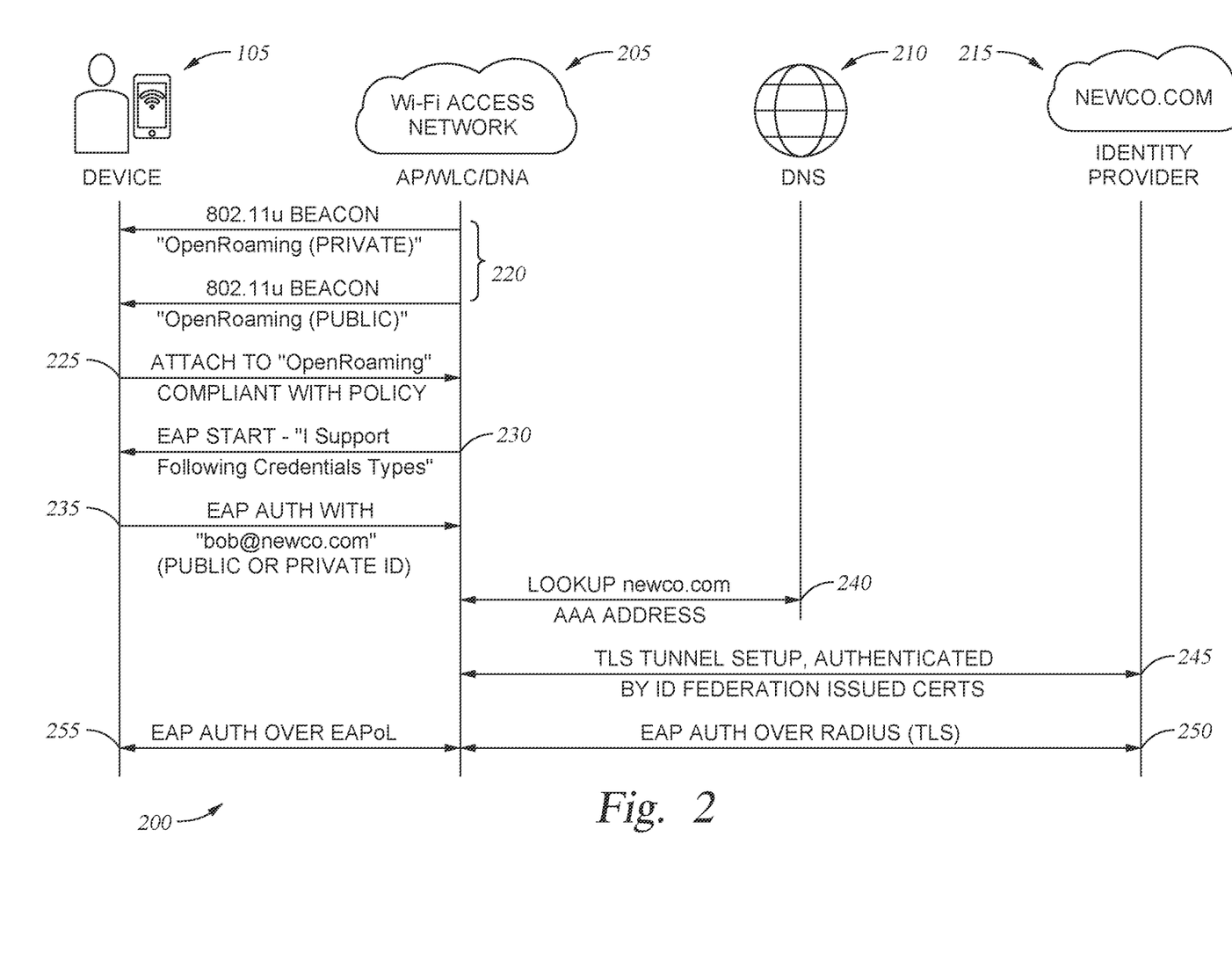
FIG. 2 is a diagram illustrating a sequence for connection of a client device to a federation-based network, according to one or more embodiments.

FIG. 2 is a diagram 200 illustrating a sequence for connection of a client device 105 to a federation-based network, according to one or more embodiments. The features illustrated in the diagram 200 may be used in conjunction with other embodiments, for example, illustrating connection of the client device 105 with an access provider 120 at any of the corporate office 110-3, the branch office 110-5, the coffee shop 110-6, or the hotel 110-7 illustrated in FIG. 1.

In the diagram 200, an access provider 205 (one example of the access providers 120 of FIG. 1) transmits a beacon 220 announcing one or more requirements for connecting the client device 105 to the access provider 205. The beacon 220 may be implemented in any suitable form, such as an IEEE 802.11u beacon. In some embodiments, the beacon 220 indicates that the client device 105 must provide a private identification for the user. In other embodiments, the beacon 220 indicates that the client device 105 must provide only a public identification.

The client device 105 attaches 225 to the access provider 205 responsive to the beacon 220 (that is, the client device 105 establishes a connection with the access provider 205), and the access provider 205 begins authentication of the user, e.g., via the Extensible Authentication Protocol (EAP) process, by communicating one or more acceptable credential types 230 to the client device 105. The client device 105 may search a list of profiles stored thereon and may automatically select an identity 235 corresponding to an acceptable credential type 230 (e.g., a token, certificate, username/password, SIM, etc.) and that best matches the one or more requirements that had been specified by the access provider 205 (e.g., via the beacon 220). In some embodiments, the identity 235 comprises elements of a Uniform Resource Locator (URL), such as a domain name. The client device 105 may select a best match using any suitable techniques.

The client device 105 provides the selected identity 235 to the access provider 205, and the access provider 205 contacts a Domain Name Service (DNS) server 210 using the identity 235. As shown in the diagram 200, the identity 235 selected by the client device 105 is "bob@newco.com", which may be a public identity or a private identity responsive on the beacon 220 transmitted by the access provider 205. The access provider 205 looks up 240 "newco.com" with the DNS server 210. Using the result from the DNS server 210, the access provider 205 sets up an encrypted and authenticated Transport Layer Security (TLS) tunnel 245 to an identity provider 215 (one example of the identity providers 130 of FIG. 1) corresponding to the selected identity 235. The identity provider 215 provides an EAP authorization 250 using Remote Authentication Dial In User Service (RADIUS) attributes to the access provider 205, and the access provider 205 provides an EAP authorization 255 to the client device 105 using EAP over LANs (EAPoL).

Figure 3:
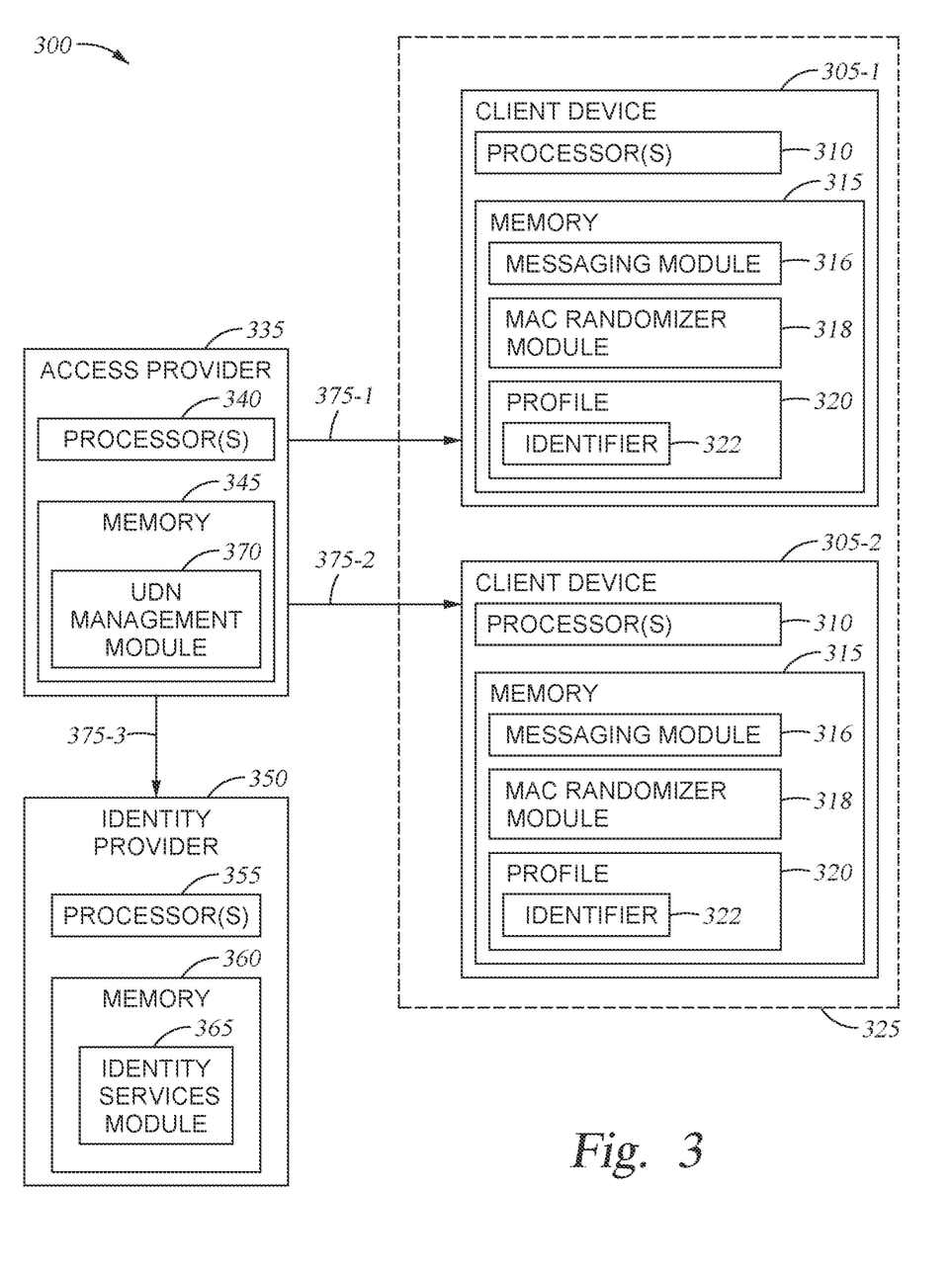
FIG. 3 is a diagram illustrating onboarding client devices to a user-defined network (UDN), according to one or more embodiments.

FIG. 3 is a diagram 300 illustrating onboarding client devices 305-1, 305-2 to a user-defined network (UDN) 325, according to one or more embodiments. The features illustrated in the diagram 300 may be used in conjunction with other embodiments. For example, the client devices 305-1, 305-2, the access provider 335, and the identity provider 350 of FIG. 3 may be respective examples of the client device 105, the access providers 120, and the identity providers 130 of FIG. 1.

In the diagram 300, the client devices 305-1, 305-2, and the identity provider 350 are connected to the access provider 335 via respective communicative links 375-1, 375-2, 375-3. Each of the client devices 305-1, 305-2, the access provider 335, and the identity provider 350 may be respectively implemented as one or more computing devices in any suitable form(s). For example, the client devices 305-1, 305-2 may be implemented as mobile computing devices of one or more users, while each of the access provider 335 and the identity provider 350 may be implemented as one or more server computers. In some embodiments, the access provider 335 represents a network of multiple computing devices. For example, a UDN management module 370 of the access provider 335 may be implemented in a manager computing device that is separate from other computing device(s) of the access provider 335.

Each of the client devices 305-1, 305-2, the access provider 335, and the identity provider 350 comprises a respective one or more computer processors 310, 340, 355 and a respective memory 315, 345, 360. The one or more computer processors 310, 340, 355 may be implemented in any suitable form, such as a general purpose microprocessor, a controller, an application-specific integrated circuit (ASIC), and so forth. The memory 315, 345, 360 may include a variety of computer-readable media selected for their size, relative performance, or other capabilities: volatile and/or non-volatile media, removable and/or non-removable media, etc.

Collectively, the access provider 335 and the identity provider 350 may represent one example of the federation-based network 115 of FIG. 1, and may be implemented using one or more networks of any suitable types, such as a public network (e.g., the Internet), a local area network (LAN), a wide area network (WAN), and/or a wireless network. The communicative links 375-1, 375-2, 375-3 may have any suitable implementation, such as copper transmission cable(s), optical transmission fiber(s), wireless transmission, router(s), firewall(s), switch(es), gateway computer(s), and/or edge server(s). In some embodiments, the communicative links 375-1, 375-2 are exclusively wireless communicative links.

The access provider 335 generally includes networking hardware that is located in proximity to the client devices 305-1, 305-2 and provides wireless connectivity (e.g., via WiFi) for the client devices 305-1, 305-2. The access provider 335 may represent one or more types of devices, such as access points (APs), switches, routers, wireless LAN controllers (WLCs), policy engines, software-defined networking (SDN) controllers, and so forth.

In some embodiments, the access provider 335 advertises its support for the automated grouping of the client devices 305-1, 305-2 into the UDN 325. For example, the access provider 335 may advertise the support responsive to receiving a query from the client devices 305-1, 305-2. In some embodiments, the query complies with Access Network Query Protocol (ANQP). In some embodiments, the access provider 335 advertises support for the federation-based network, as well as for the automatic grouping, using new ANQP elements.

Beneficially, the client devices 305-1, 305-2 may preferentially select the access provider 335 that advertises support for the automated grouping of the client devices 305-1, 305-2. For example, the client devices 305-1, 305-2 may scan for available networks and rate the access provider 335 higher due to the advertising support.

The identity provider 350 generally provides authentication of the client devices 305-1, 305-2 for onboarding to the UDN 325. As discussed above, some examples of the identity provider 350 include cloud providers, service providers, and device manufacturers. The identity provider 350 may use any suitable authentication protocols, such as OAuth, Remote Authentication Dial-In User Service (RADIUS), Security Assertion Markup Language (SAML), and so forth.

The memory 315, 345, 360 may include one or more modules for performing various functions described herein. In one embodiment, each module includes program code that is executable by the respective one or more computer processors 310, 340, 355. In another embodiment, each module is partially or fully implemented in hardware (i.e., circuitry) or firmware of the client devices 305-1, 305-2, the access provider 335, and/or the identity provider 350 (e.g., as circuitry within the one or more computer processors 310, 340, 355). However, other embodiments of the diagram 300 may include modules that are partially or fully implemented in other hardware or firmware, such as hardware or firmware included in one or more other computing devices connected with the access provider 335, and so forth. Stated another way, the overall functionality of the one or more modules may be distributed among other devices of the diagram 300.

As shown, the memory 315 of each of the client devices 305-1, 305-2 comprises a messaging module 316 and a MAC randomizer module 318, the memory 360 of the identity provider 350 comprises an identity services module 365, and the access provider 335 comprises a UDN management module 370.

The identity services module 365 generally operates to create, maintain, and/or manage identity information for users and/or for the associated client devices 305-1, 305-2. The identity services module 365 may further provide authentication services using the access provider 335. In some embodiments, the identity services module 365 provides a credential used to authenticate a user for accessing a network-based service. The credential may be implemented in any suitable form, such as a secure token that is unique for a particular session with the user. In some embodiments, the secure token comprises a value provided by the identity provider 350, an identifier of the identity provider 350, and/or a value provided by the provider of the network-based service security.

Each client device 305-1, 305-2 includes a profile 320 that is associated with the user of the client device 305-1, 305-2. Each profile 320 includes one or more selectable identities for connecting to the federation-based network. For example, a user may have an employer-provided identity and one or more personal identities. Each profile 320 may allow one or more services, policies, capabilities, features, etc. that are applied when the profile 320 is selected. For example, additional security service(s) may be applied for an employer-provided identity than for a personal identity. The one or more services, policies, capabilities, features, etc. may be selected and/or purchased directly by the user, or may be offered directly by the access provider 335 to the user.

Each profile 320 may include any other suitable information, such as a username and/or personal information. In some embodiments, the profile 320 includes a user-friendly device name, a unique identifier 322 for each device associated with (and managed by) the user, and/or a list of one or more UDNs associated with the device (e.g., associated with the unique identifier 322). In some embodiments, the unique identifier 322 comprises a serial number assigned to the client device 305-1, 305-2.

In some embodiments, the identity services module 365 may store an inventory of client devices 305-1, 305-2 associated with the user. Using the inventory of client devices 305-1, 305-2, the user may establish different UDN groupings such as business and personal UDNs, and may access each of the UDNs using the same profile 320. Additionally, the inventory of client devices 305-1, 305-2 may be updated to limit access by certain client devices 305-1, 305-2, such as when the client devices 305-1, 305-2 have unauthorized use, or are lost or stolen.

The UDN management module 370 performs supervisory and/or maintenance functions for the UDN 325. In some embodiments, the identity provider 350 creates the UDN 325 responsive to receiving a request from a client device 305-1, 305-2, and adds the requesting client device 305-1, 305-2 to the UDN 325. The identity provider 350 propagates the information about the created UDN 325 to the UDN management module 370, where it is stored and updated as appropriate.

In some embodiments, the UDN management module 370 maintains a list of one or more UDNs associated with each identity. The list of the one or more UDNs may also be stored by the identity provider 350 separate from the UDN management module 370, e.g., when the UDN management module 370 is implemented in a separate computing device. After the client device 305-1 is authenticated, the UDN management module 370 queries for the list of UDN(s) associated with the client device 305-1. The UDN management module 370 receives the list of UDN(s) from the identity provider 350 through the UDN cloud (e.g., UDN cloud 630 shown in FIG. 6a). The list of UDN(s) is stored by the UDN management module 370.

A similar process may be performed for the client device 305-2. After successful authentication of the client device 305-2, the access provider 335 (e.g., the UDN management module 370) queries the list of UDN(s) associated with the client device 305-2, receives the list of UDN(s) from the identity provider 350 and stores the list of UDN(s) in the UDN management module 370.

When the UDN management module 370 finds a matching UDN definition in the lists received for the client devices 305-1, 305-2, the UDN management module will automatically form the UDN 325 (e.g., creates a local instance of the UDN 325 using the MAC addresses of the client devices 305-1, 305-2 and the identifier 322) and places the client devices 305-1, 305-2 inside the UDN 325.

Beneficially, while the access provider 335 receives the MAC address of the client device 305-1, 305-2, in some embodiments the MAC address is not transmitted to the federation-based network or to the identity provider 350 when joining the client device 305-1, 305-2 to the UDN 325. In this way, the user may have improved privacy as the various network devices are unable to track locations, lengths of time used, etc. using the user's MAC address(es).

Further, as discussed above, some implementations of the client devices 305-1, 305-2 may intermittently change the MAC address presented to the access provider 335. For example, the client devices 305-1, 305-2 each include a MAC randomizer module 318 that randomizes the MAC address of the respective client device 305-1, 305-2 according to any suitable techniques. In other embodiments, the MAC addresses of the client devices 305-1, 305-2 may be intermittently altered without randomization.

Ordinarily, changing the MAC address of the client devices 305-1, 305-2 would disrupt access to the UDN 325, possibly requiring a manual reconfiguration. However, by using the identifier 322 associated with the federation-based network, the access provider 335 may ensure continued access of the client devices 305-1, 305-2 to the UDN 325 despite any changes to the MAC addresses.

In some embodiments, the system illustrated in the diagram 300 may also support the ad hoc joining of client devices 305-1, 305-2 to the UDN 325. For example, two colleagues at a conference may wish to set up a UDN for directed P2P messaging, file sharing, etc. with each other. In one example sequence, the client devices 305-1, 305-2 are authenticated using the respective identifiers 322 (e.g., through the access provider 335 at the site of the conference). The user of the client device 305-1 may create the UDN 325 using the techniques discussed above. The user of the client device 305-1 may then use the messaging module 316 to send an invitation to the user of the client device 305-2.

The messaging module 316 may be implemented in any suitable form for transmitting an invitation to the UDN 325. Some non-limiting examples of the messaging module 316 include an email client, a dedicated messaging client, and a social networking client. Further, the invitation may be provided to the client device 305-2 in any suitable format, such as a hyperlink. Beneficially, the messaging module 316 may be implemented using application(s) on the client devices 305-1, 305-2 that are already used by the user (e.g., without requiring use of a specialized application).

When the user of client device 305-2 accepts the invitation, the client device 305-2 transmits an authentication request (with the identifier 322) that is transmitted to the UDN management module 370. The UDN management module 370 may transmit the list of UDN(s) associated with the identifier to the access provider 335, and the access provider 335 may join the client device 305-2 to the UDN 325. Because the UDN 325 is defined over the identifiers 322 of the client devices 305-1, 305-2, the client devices 305-1, 305-2 may migrate to different access providers 335 (e.g., at locations different from the site of the conference) while providing a same experience.

Figure 4:
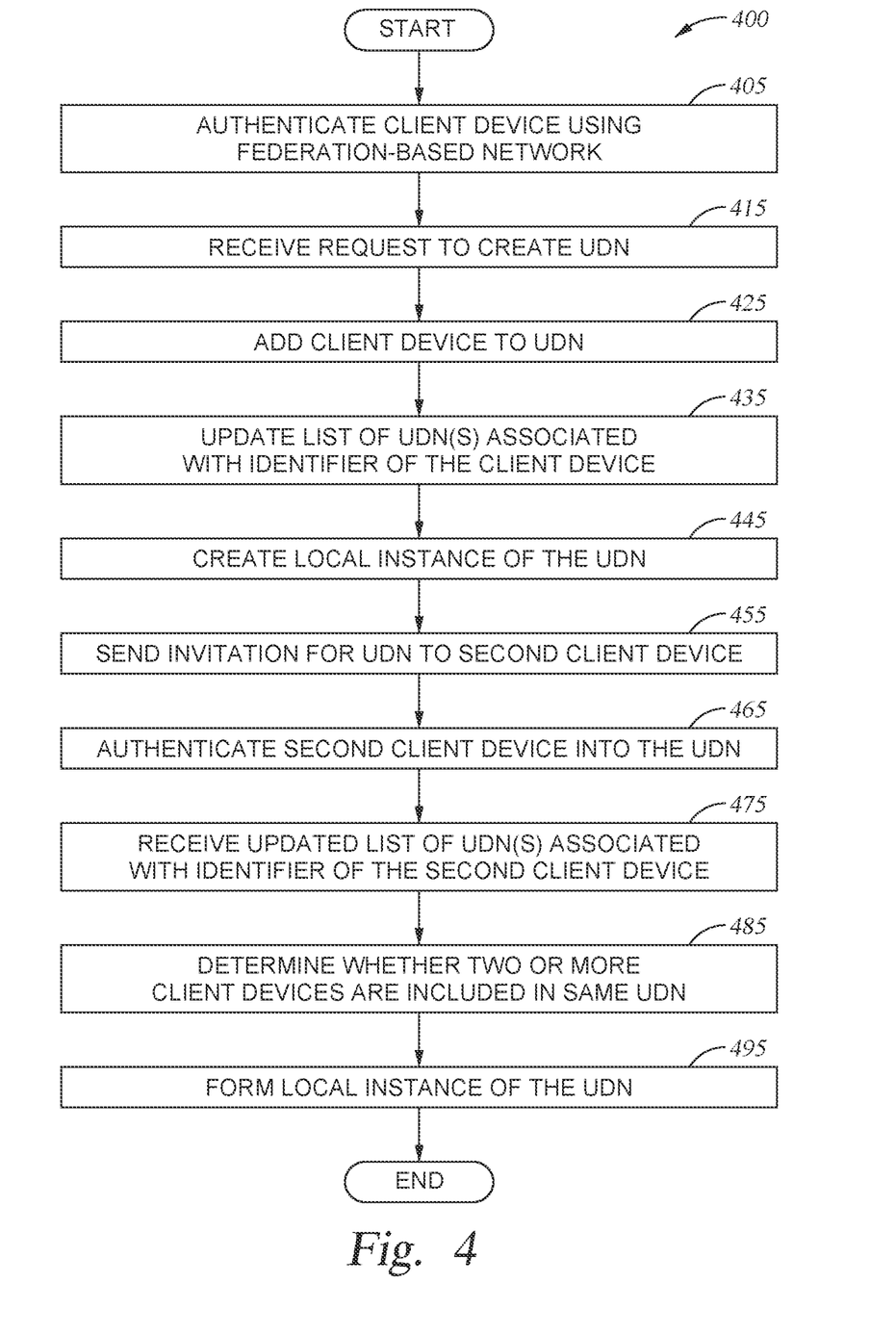
FIG. 4 is a method of creating a UDN using an authenticated client device, according to one or more embodiments.

FIG. 4 is a method 400 of creating a UDN using an authenticated client device, according to one or more embodiments. The method 400 may be used in conjunction with other embodiments, e.g., performed using a combination of the access provider 335, and the identity provider 350 of FIG. 3.

The method 400 begins at block 405, where a client device is authenticated using a federation-based network. In some embodiments, the access provider contacts an identity provider to authenticate the client device. At block 515, a request to create a UDN is received, and at block 525, the client device is added to the UDN. In some embodiments, the identify provider receives the request, creates the UDN, and adds the client device to the UDN.

At block 435, a list of one or more UDNs associated with the identifier of the client device is updated. In some embodiments, the identity provider updates the list and forwards the list to the access provider. At block 445, the access provider creates a local instance of the UDN using the MAC address of the client device and the unique identifier of the client device.

At block 455, the user of the client device sends an invitation for the UDN to a second client device. At block 465, the second client device is authenticated into the UDN using the identity provider (or another identity provider). The identity provider may update the list of UDNs associated with the second client device. At block 475, the access provider receives the updated list of UDNs associated with the second client device. At block 485, the access provider determines whether two or more client devices (here, the first client device and the second client device) are included in the same UDN. At block 495, the access provider creates a local instance of the UDN when the two or more client devices are included in the UDN. The method 400 ends following completion of block 485.

Figure 5:
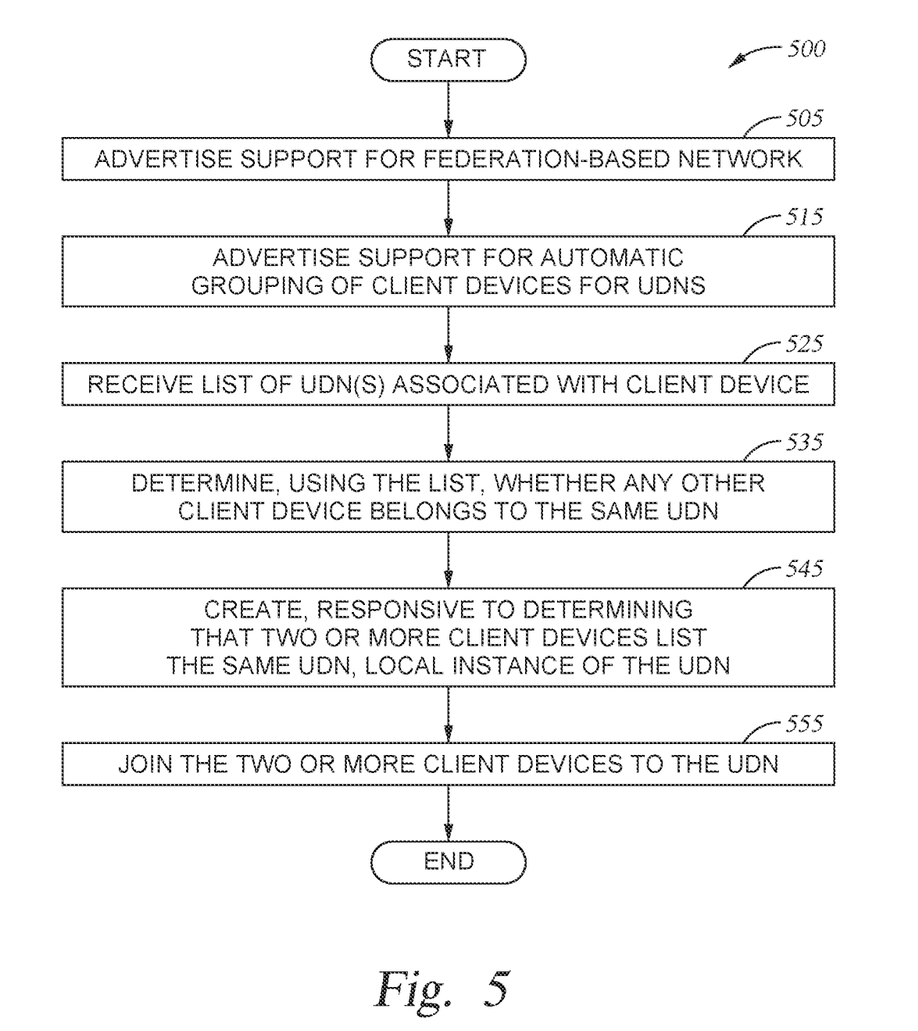
FIG. 5 is a method of automated grouping of client devices for a UDN, according to one or more embodiments.

FIG. 5 is a method 500 of automated grouping of client devices for a UDN, according to one or more embodiments. The method 500 may be used in conjunction with other embodiments, e.g., performed using the access provider 335 of FIG. 3.

The method 500 begins at block 505, where the access provider advertises support for the federation-based network. At block 515, the access provider advertises support for the automatic grouping of client devices for UDNs. In some embodiments, the advertising of block 505 and 515 is responsive to a query from a client device, such as an ANQP query.

At block 525, the access provider requests a list of one or more UDNs that are associated with the client device. In some embodiments, the access provider requests the list responsive to the client device being authenticated by an identity provider. In some embodiments, the access provider transmits a unique identifier of the client device to the UDN network (UDN cloud).

At block 535, the access provider determines, using the list of UDN(s), whether any other client device that is currently on the access provider network belongs to a same UDN. At block 545, responsive to determining that two or more client devices list the same UDN, the access provider creates the local instance of the UDN. At block 555, the access provider joins the two or more client devices to the UDN. The method 500 ends following completion of block 555.

Figure 6A:
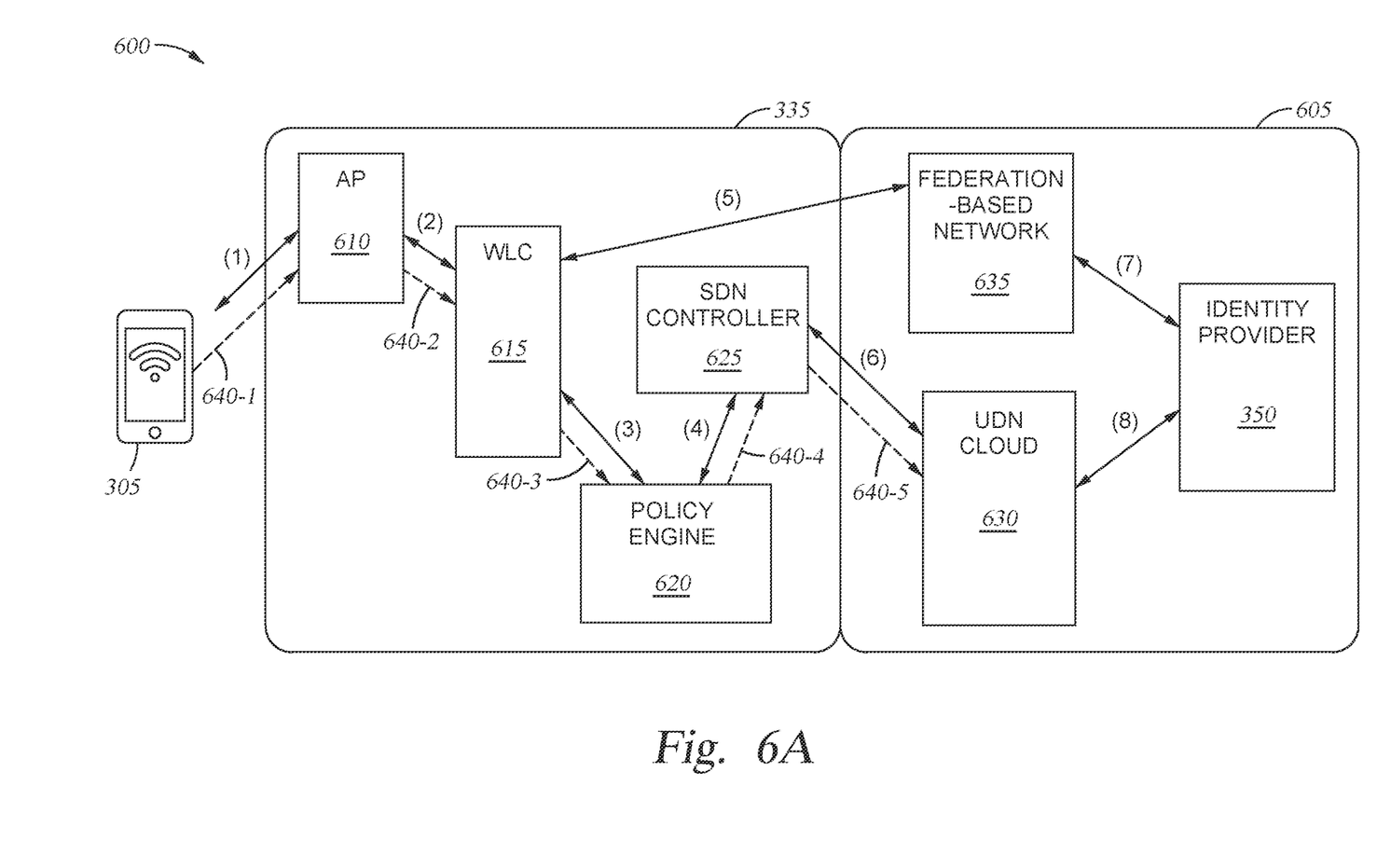
FIGS. 6A and 6B illustrate a sequence of joining a client device to a UDN, according to one or more embodiments.
Figure 6B:
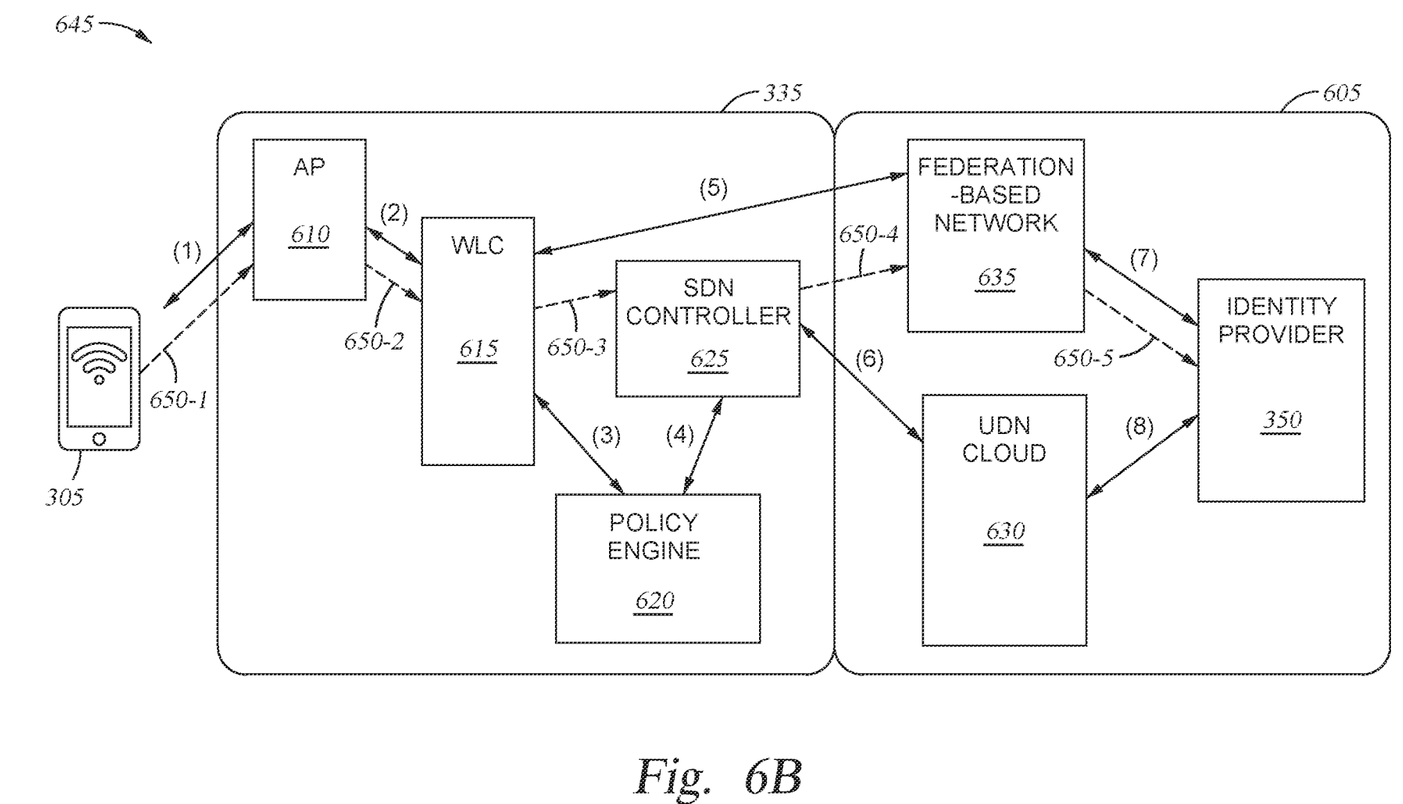

FIGS. 6A and 6B illustrate a sequence of joining a client device to a UDN, according to one or more embodiments. The features illustrated in diagrams 600, 645 may be used in conjunction with other embodiments. For example, the diagrams 600, 645 may represent one or more blocks of the method 400 of FIG. 4.

As discussed above, the access provider 335 represents networking hardware that is located in proximity to the client device 305 and provides wireless connectivity for the client device 305. In some embodiments, the networking hardware of the access provider 335 is owned or operated by a venue. The diagrams 600, 645 further comprises cloud-based infrastructure 605 that represents networking hardware that may be located remotely from the client device 305 and/or the access provider 335.

The access provider 335 comprises an access point (AP) 610, a wireless LAN controller (WLC) 615, a policy engine 620, and a software-defined network (SDN) controller 625. In some embodiments, the AP 610 provides access to the client device 305, the WLC 615 joins the client device 305 and orchestrates authentication, the policy engine 620 provides dynamic user (or the client device 305) to group mapping and policy definition, and the SDN controller 625 provides centralized management and control, automation, and policy enforcement across physical and virtual network environments.

The cloud-based infrastructure 605 comprises a user-defined network (UDN) cloud 630, a federation-based network 635, and the identity provider 350. Generally, the UDN cloud 630 represents the cloud-based devices that manage the propagation of UDN information from the identity provider 350 (e.g., maintained lists of UDNs in which the client devices are included) to the access provider 335 (e.g., which groups the client devices into local instances of UDN(s) based on the received lists).

In one exemplary sequence, the client device 305 detects advertising by the access provider 335 that indicates support for automatic grouping of client devices into UDNs. The client device 305 transmits an authentication request that includes a unique identifier of the client device. In the diagram 600, the unique identifier is transmitted to the UDN cloud 630 via the AP 610, the WLC 615, the policy engine 620, and the SDN controller 625. In this way, the access provider 335 can map the current MAC address of the client device to the UDN grouping without transmitting the MAC address to the federation-based network or the identity provider 350.

In the diagram 645, the authentication request of the client device 305 is transmitted to the identity provider 350 via the AP 610, the WLC 615, the SDN controller 625, and the federation-based network 635. When the identity provider 350 confirms the authentication request, the user is authenticated without creating a UDN.

The UDN cloud 630 may send a list of UDNs associated with the unique identifier to the access provider 335. The WLC 615, the policy engine 620, and the SDN controller 625 may join the client device 305 to the local instance of the UDN if the list indicates that the client device 305 belongs to the UDN listed by another device also associated on the network.

In an alternate implementation, the access provider 335 may create a UDN for every device, even for cases where no other devices from the same UDN are present. Beneficially, creating the UDN allows undesired traffic (e.g., P2P traffic) to be blocked, while any desired traffic (e.g., mDNS or broadcast traffic) is added by the access provider 335 as a shared resource. In this way, creating the UDNs provides a granularity for attaching policies. For example, the policies may be applied per-user and not per-device, which tends to simplify the workflow.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of automated grouping of client devices for a user-defined network (UDN), the method comprising:
  receiving, from a first client device, an authentication request to join an access provider network, wherein the authentication request includes a unique identifier of the first client device for a federation-based network;
  transmitting the unique identifier to a UDN cloud;
  transmitting the authentication request to an identity provider;
  receiving, responsive to the identity provider authenticating the authentication request, a first list from the UDN cloud, wherein the first list indicates that the UDN is associated with the unique identifier; and
  joining the first client device with a second client device present on the access provider network based on a second list from the UDN cloud, wherein the second list indicates that the UDN is associated with the second device.

2. The method of claim 1, further comprising:
advertising support for the federation-based network; and
advertising support for an automatic grouping of client devices for UDNs.

3. The method of claim 2, wherein the advertising support for the federation-based network and the advertising support for the automatic grouping of client devices are responsive to receiving a query from the first client device.

4. The method of claim 3, wherein the query from the first client device complies with Access Network Query Protocol (ANQP).

5. The method of claim 1, wherein a Media Access Control (MAC) address of the first client device is not transmitted to the federation-based network or to the identity provider.

6. The method of claim 1, further comprising:
receiving, from the second client device, a request to join the access provider network using a unique identifier of the second client device for the federation-based network; and
creating, using a Media Access Control (MAC) address of the second client device and the unique identifier of the second client device, a local instance of the UDN.

7. The method of claim 1, wherein the unique identifier is stored by the first client device in a profile for the federation-based network.

8. A network device comprising:
a memory; and
one or more computer processors communicatively coupled to the memory and configured to perform an operation comprising:
receiving, from a first client device, an authentication request to join an access provider network, wherein the authentication request includes a unique identifier of the first client device for a federation-based network;
transmitting the unique identifier to a UDN cloud;
transmitting the authentication request to an identity provider;
receiving, responsive to the identity provider authenticating the authentication request, a first list from the UDN cloud, wherein the first list indicates a UDN that is associated with the unique identifier; and
joining the first client device with a second client device present on the access provider network based on a second list from the UDN cloud, wherein the second list indicates that the UDN is associated with the second device.

9. The network device of claim 8, the operation further comprising: advertising support for the federation-based network; and advertising support for an automatic grouping of client devices for UDNs.

10. The network device of claim 9, wherein the advertising support for the federation-based network and the advertising support for the automatic grouping of client devices are responsive to receiving a query from the first client device.

11. The network device of claim 10, wherein the query from the first client device complies with Access Network Query Protocol (ANQP).

12. The network device of claim 8, wherein a Media Access Control (MAC) address of the first client device is not transmitted to the federation-based network or to the identity provider.

13. The network device of claim 8, the operation further comprising:
receiving, from the second client device, a request to join the access provider network using a unique identifier of the second client device for the federation-based network; and
creating, using a Media Access Control (MAC) address of the second client device and the unique identifier of the second client device, a local instance of the UDN.

14. The network device of claim 8, wherein the unique identifier is stored by the first client device in a profile for the federation-based network.

15. A computer program product comprising:
a non-transitory computer-readable storage medium having computer-readable program code embodied therewith, the computer-readable program code executable by one or more computer processors to perform an operation comprising:
receiving, from a first client device, an authentication request to join an access provider network, wherein the authentication request includes a unique identifier of the client device for a federation-based network;
transmitting the unique identifier to a UDN cloud;
transmitting the authentication request to an identity provider;
receiving, responsive to the identity provider authenticating the authentication request, a first list from the UDN cloud, wherein the first list indicates that the UDN is associated with the unique identifier; and
joining the first client device with a second client device present on the access provider network based on a second list from the UDN cloud, wherein the second list indicates that the UDN is associated with the second device.

16. The computer program product of claim 15, the operation further comprising:
advertising support for the federation-based network; and
advertising support for an automatic grouping of client devices for UDNs.

17. The computer program product of claim 16, wherein the advertising support for the federation-based network and the advertising support for the automatic grouping of client devices are responsive to receiving a query from the first client device.

18. The computer program product of claim 17, wherein the query from the first client device complies with Access Network Query Protocol (ANQP).

19. The computer program product of claim 15, wherein a Media Access Control (MAC) address of the first client device is not transmitted to the federation-based network or to the identity provider.

20. The computer program product of claim 15, the operation further comprising:
receiving, from the second client device, a request to join the access provider network using a unique identifier of the second client device for the federation-based network; and
creating, using a Media Access Control (MAC) address of the second client device and the unique identifier of the second client device, a local instance of the UDN.

* * * * *